United States Patent [19]

Castagnos, Jr. et al.

[11] 4,419,221
[45] Dec. 6, 1983

[54] CRACKING WITH SHORT CONTACT TIME AND HIGH TEMPERATURES

[75] Inventors: Leonce F. Castagnos, Jr., Nederland; Roy E. Pratt, Neches, both of Tex.

[73] Assignee: Texaco Inc., White Plains, N.Y.

[21] Appl. No.: 315,468

[22] Filed: Oct. 27, 1981

[51] Int. Cl.³ .......................... C10G 11/18; B01J 8/36
[52] U.S. Cl. .................................. 208/113; 208/155; 208/159; 208/164; 502/41; 422/144; 422/214
[58] Field of Search ............... 208/113, 153, 164, 120; 422/145, 144, 214

[56] References Cited

U.S. PATENT DOCUMENTS

| | | | |
|---|---|---|---|
| 3,053,643 | 9/1962 | Osborne | 208/164 |
| 3,186,805 | 6/1965 | Gomory | 208/153 X |
| 3,821,103 | 6/1974 | Owen et al. | 208/72 |
| 3,844,973 | 10/1974 | Stine et al. | 208/120 |
| 3,888,762 | 6/1975 | Gerhold | 208/120 |
| 3,893,812 | 7/1975 | Conner et al. | 208/164 |
| 3,923,686 | 12/1975 | Stine et al. | 208/164 |
| 4,283,273 | 8/1981 | Owen | 208/113 |
| 4,297,203 | 10/1981 | Ford et al. | 208/74 |
| 4,309,308 | 1/1982 | Vickers | 208/113 |
| 4,310,411 | 1/1982 | Wilkening | 208/153 |
| 4,331,533 | 5/1982 | Dean et al. | 208/113 |
| 4,332,674 | 6/1982 | Dean et al. | 208/120 |

Primary Examiner—Patrick Garvin
Assistant Examiner—O. Chaudhuri
Attorney, Agent, or Firm—Carl G. Ries; James F. Young; Robert Knox, Jr.

[57] ABSTRACT

A method and apparatus for catalytic conversion of hydrocarbon feedstocks and regeneration of coked catalyst resulting from the hydrocarbon conversion reaction in which the catalyst regeneration is carried out in a combination of dense phase fluidized bed, an entrained phase regeneration zone and a second dense phase fluidized bed and the hydrocarbon conversion reaction is carried out in a high velocity short contact time dilute phase reaction zone wherein the reaction time and temperature and the regenerator temperature may be separately varied to provide and maintain optimum conversion conditions.

6 Claims, 1 Drawing Figure

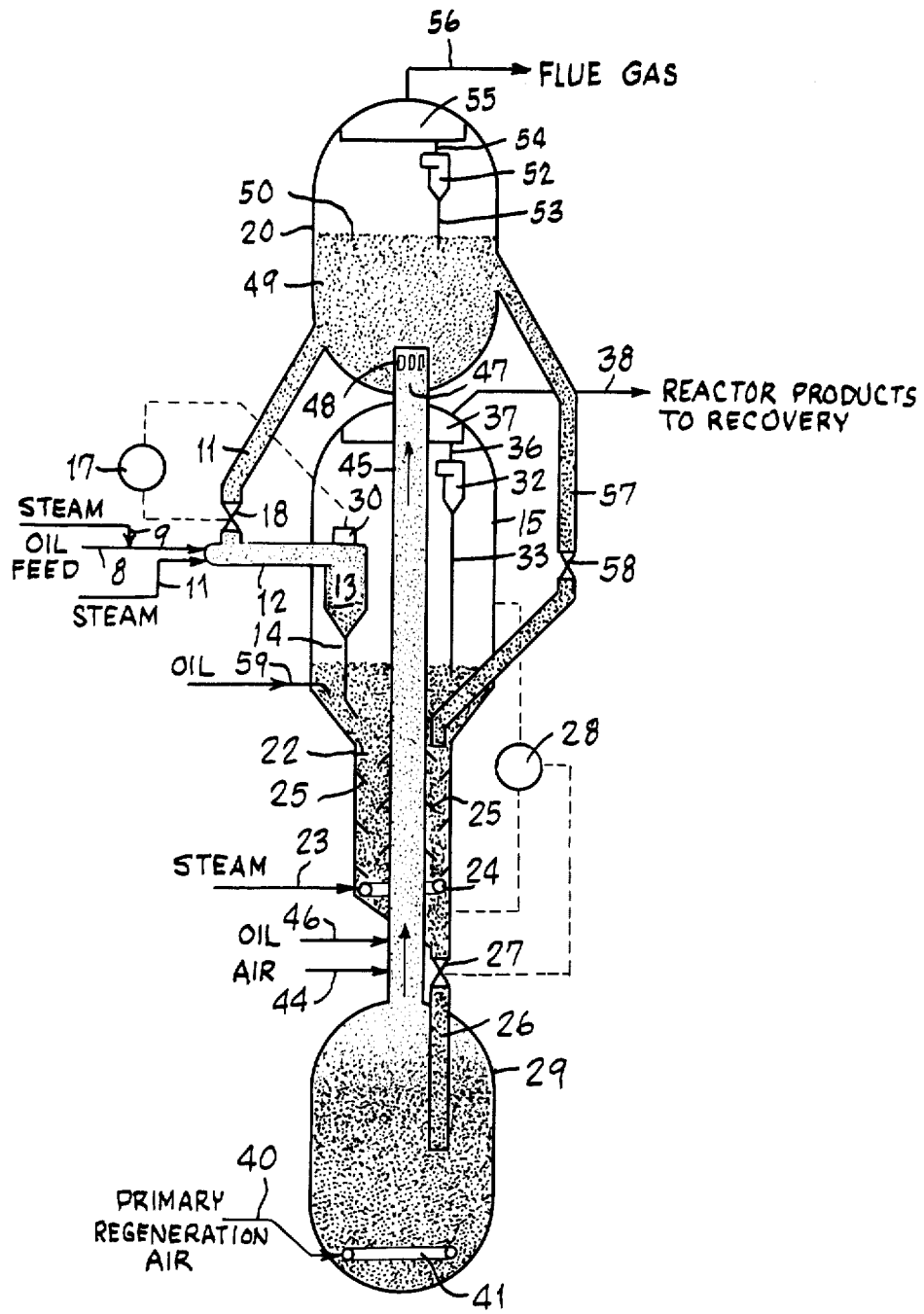

CRACKING WITH SHORT CONTACT TIME AND HIGH TEMPERATURES

This invention relates to fluidized catalytic cracking. In one of its more specific aspects, it relates to a method for controlling a fluidized catalytic cracking process to obtain a desired product distribution. In another of its more specific aspects, it relates to an improved method of regeneration of spent cracking catalyst. In still another of its more specific aspects, this invention relates to an improved method for the cracking of hydrocarbon feedstocks in a cocurrent transport type reaction zone.

Fluidized catalytic conversion processes for the processing of petroleum fractions are well known. In a fluidized catalytic cracking process, a hydrocarbon oil feedstock is contacted with a catalyst in a reaction zone under conditions such that the hydrocarbon feedstock is converted into desired products accompanied by the deposition of coke on the surface of the catalyst particles. Such systems may comprise a transport type reaction zone through which vaporized hydrocarbon and a solid particulate catalyst suspended in the hydrocarbon vapors are passed concurrently. The reaction products and catalyst are discharged from the transport type reaction zone into a separation zone in which hydrocarbon are separated from the catalyst. During its passage through the reaction zone the catalyst becomes partially deactivated due to the deposition of coke thereon and is often referred to as "spent" catalyst as contrasted with regenerated or fresh catalyst. Regenerated catalyst has a lower coke content and higher catalytic activity than the spent catalyst removed from the reaction zone.

In the regeneration of catalyst, the spent catalyst from the reaction zone may be contacted in a stripping zone with a stripping medium, usually steam, to remove vaporizable entrained and occluded hydrocarbons therefrom. From the stripping zone, stripped catalyst may be passed into a regeneration zone wherein the stripped catalyst is regenerated by burning coke therefrom with an oxygen-containing gas, usually air. The resulting hot regenerated catalyst from the regeneration zone may be brought into contact with additional hydrocarbon feedstock in the reaction zone.

Hydrocarbon vapor from the reaction zone may be passed to a fractionation zone for the recovery of hydrocarbon liquid fractions and separation into desired product fractions according to their boiling ranges. For example, liquid hydrocarbons recovered from the product effluent from a fluidized catalytic cracking unit may be separated into a gasoline and lighter components fraction, a light cycle gas oil fraction, an intermediate cycle gas oil fraction, and a heavy cycle gas oil bottoms, or residual, fraction.

The yield of desirable products from a fluidized catalytic cracking process may be controlled within certain limits by selecting the charge stock, the catalyst, hydrocarbon conversion conditions within the reaction zone, i.e., the temperature, pressure and catalyst-oil contact time, the catalyst-to-oil ratio, etc.

In one of its more specific aspects, the process of this invention is suited to the production of light olefins, particularly ethylene and propylene, from paraffinic hydrocarbon feedstocks. In another of its more specific aspects, the process may be for conversion of aromatic and refractory feedstocks and is effective for dehydrogenation, disproportionation, and the like. The process of this invention also provides a method for producing a high yield of liquid products, particularly gasoline, from conventional vacuum gas oil feedstocks by utilizing high activity catalyst in conjunction with short contact time and moderately high temperature.

In a preferred form of this invention, there is provided an improved process for catalytically cracking a hydrocarbon feed in the presence of a zeolite cracking catalyst in which the contact time between the hydrocarbon feedstock and the catalyst is limited to less than one second, preferably within the range of from about 0.1 to about 1 second.

In accordance with the method of the present invention, a fluidized catalytic cracking process is provided which permits precise control of reaction time and temperature to provide optimum reaction conditions for a hydrocarbon feedstock. This is accomplished in the process and apparatus of the present invention by suspending hot regenerated catalyst in preheated oil feedstock and passing the suspension of catalyst in oil vapors and reaction products in cocurrent flow through a high temperature, high velocity short contact time dilute phase reaction zone and effecting immediate separation of the reaction products from the spent catalyst. Other features of the process include stripping of the used catalyst from the reaction with stripping steam at high temperature by the addition of hot regenerated catalyst to the spent catalyst prior to stripping of the hydrocarbons from the spent catalyst. The spent catalyst is regenerated in a novel combination of regeneration zones which comprise a first dense phase catalyst bed regeneration zone, a dilute phase riser regeneration zone, and a second dense phase catalyst bed regeneration zone so constructed and arranged as to provide maximum utilization of heat liberated by the exothermic regeneration reactions. Another feature of the process and apparatus of the present invention provides for stripping of the spent catalyst from the reaction zone in a stripping zone in indirect heat exhange with catalyst undergoing regeneration by combustion of coke with air in the riser regeneration zone.

It is already known in the prior art from U.S. Pat. No. 3,835,029, that the contact time between hydrocarbon conversion reactants and catalyst may be controlled within the range of from 0.2 to 5 seconds by suspending catalyst in a mixture of hydrocarbon feed and steam in a down flow cocurrent catalytic cracking zone in which the velocity of the catalyst is within the range of about 30 to 100 feet per second. It is also known from U.S. Pat. No. 4,035,284 to carry out regeneration of spent catalyst in a dense fluid catalyst bed superimposed by a dispersed catalyst phase operation at a temperature in the range of 1175° to 1350° F. It is known also, from U.S. Pat. No. 2,994,659, to conduct the spent catalyst stripping operation at a temperature in the range of 1100° to 1250° F. by introducing freshly regenerated catalyst into admixture with spent catalyst from the reaction zone prior to stripping the spent catalyst with steam.

The method and apparatus of this invention provides extreme flexibility, both with respect to hydrocarbon conversion and catalyst regeneration operations, as will be apparent from a detailed description of a preferred embodiment of the process of this invention as described hereinafter.

The FIGURE is a diagrammatic representation of a preferred form of apparatus forming a part of the present invention and suitable for carrying out the process of this invention.

With reference to the drawing, a preheated virgin gas oil feed boiling in the range of from 450° to 1050° F. is supplied to the process through line 8, optionally mixed with dispersion steam supplied to oil feed line 8 through line 9, and contacted with hot regenerated catalyst from a standpipe 10, optionally in admixture with aeration steam from line 11 at the inlet to a horizontal high temperature, high velocity, short contact time dilute phase reaction zone 12. The velocity of the catalyst, oil vapor, and optional steam in reaction zone 12 is sufficient to preclude substantial settling or saltation in the reactor. The resulting mixture of catalyst and oil vapor, suitably at an average velocity of about 40 feet per second, passes through the reaction zone 12 into a cyclone type separator 13 wherein the catalyst is separated from the hydrocarbon conversion products. Catalyst is discharged from the cyclone separator 13, through line 14 into a dense phase fluidized bed of catalyst in vessel 15 which comprises a catalyst stripping bed section 22.

Substantial conversion of the fresh feed occurs in the transport reactor 12 under carefully controlled time-of-contact conditions with the catalyst separated from the reaction products immediately upon discharge from the reaction zone. The desired reaction temperature within the dilute phase reaction zone 12 is obtained by employing means 17 responsive to the temperature at separator 13 to adjust a slide valve 18 regulating the amount of regenerated catalyst admitted from regeneration zone 20 into the dilute phase reaction zone 12. The slide valve 18 controls the amount of regenerated catalyst which enters the reactor 12 at a rate such that the desired reaction temperature is maintained in the reactor.

Catalyst separated from the reaction products in separator 13 is discharged through line 14 into a dense phase fluidized bed catalyst stripping zone, or stripper, 22 in the lower portion of vessel 15. Steam from line 23 is introduced into steam ring 24 and discharged into the lower portion of vessel 15 below the outlet from standpipe 14. Baffles 25, suitably circular in plan view, not shown, provide intimate contact between stripping steam and catalyst in the stripper and mixing of spent catalyst with hot regenerated catalyst described later. Catalyst in the stripping section 22 of vessel 15 is stripped by the steam introduced through line 23. The stripped catalyst passes downwardly through standpipe 26 and catalyst valve 27 as controlled by a differential pressure level controller 28 into a primary dense phase fluidized bed regeneration zone 29.

Steam rising through the stripper 22 removes occluded and entrained hydrocarbons from the catalyst. The steam and removed hydrocarbon vapors pass upwardly through the dense phase fluidized bed of catalyst and are disengaged from the catalyst in the upper portion of vessel 15 which preferably has an enlarged cross-sectional area relative to stripper 22 to reduce the gas velocity in the upper section of vessel 15 and thereby facilitate separation of catalyst from steam and hydrocarbon vapors.

Vaporized products of reaction from the high temperature high velocity short contact time dilute phase reaction zone 12, separated from the spent catalyst in separator 13, are discharged into the dilute phase section of vessel 15 through outlet 30 into admixture with steam and hydrocarbon vapors from stripper 22. The mixture of steam and vaporized hydrocarbons enters cyclone separator 32 where entrained catalyst is separated from the hydrocarbon vapors and returned to the catalyst bed through dipleg 33. Although only one cyclone separator is illustrated in the drawing, it will be understood that several such separators may be assembled in parallel and in series to achieve substantially complete separation of solid particles of catalyst from the mixture of hydrocarbon vapors and steam and that a plurality of such assemblies may be employed to handle the relatively large volume of vapor which normally is present in this part of the process. Effluent vapors pass from separator 32 through line 36 into plenum chamber 37 where gases from other cyclone assemblies, not shown, are collected and discharged from the vessel 15 through line 38.

In regenerator 39, a dense phase fluidized bed of spent catalyst is contacted with primary regeneration air introduced through line 40 to air distributor ring 41. Oxygen from the air burns accumulated coke from the stripped catalyst thereby regenerating the catalyst. Most of the coke is burned from the catalyst in the primary regeneration zone 29. Catalyst undergoing regeneration in the lower primary regeneration zone 29 forms a fluidized dense phase bed which completely fills the primary regeneration zone.

Flue gases resulting from the combustion of coke and entrained catalyst from primary regenerator 29 flow upwardly through riser regeneration zone 45 passing through stripper 22 and the vapor-solid separation section in the upper portion of vessel 15.

Heat from regeneration of the catalyst is supplied to stripper 22 by indirect heat exchange between the hot solids and gases in riser regeneration zone 45 and in stripper 22. Secondary regeneration air is introduced into the riser regeneration zone 45 through line 44 in an amount sufficient to supply an excess of oxygen in the regeneration system. Oil, such as a heavy cycle gas oil or torch oil, may be added to riser 45 through line 46. In this regeneration system, coke introduced into the regenerator with the spent catalyst is ultimately completely consumed to carbon dioxide, part of the oxidation taking place in the primary regenration zone 29 and further combustion occurring in the riser regeneration zone 45 and a second dense phase fluidized bed of regenerated catalyst contained in vessel 20.

FLue gases and entrained catalyst from riser regeneration zone 45 are discharged into the lower part of a dense phase fluidized bed of regenerated catalyst in vessel 20 through a discharge head 47 provided with a plurality of discharge slots 48 at the upper end of the riser conduit 45. The mixture of catalyst and flue gases is discharged from the riser conduit 45 into the enlarged vessel 20 wherein there is a substantial reduction in the velocity of the mixture permitting the catalyst to settle out and forming a dense phase fluidized bed of catalyst 49 having an upper level 50. FLue gases, comprising nitrogen, carbon dioxide and steam, and containing from 1 to 10 mole percent excess oxygen and less than about 200 ppm carbon monoxide, are passed through cyclone separator 52 wherein finely divided entrained solid particles are separated from the gas stream and returned by dipleg 53 to the dense phase catalyst bed. The cyclone separator 52, although represented as a single unit, may comprise an assembly of cyclone separators arranged in parallel and in series to effect substantially complete separation of entrained solids from the flue gas. The effluent gas mixture from cyclone separator 52 passes through line 54 into plenum chamber 55 from which it is discharged through flue gas line 56 to vent facilities, not illustrated.

Part of the regenerated catalyst contained in the upper dense phase regeneration bed in vessel 20 is withdrawn from the bottom of regenerator 20 through standpipe 10 at a rate controlled by slide valve 18, previously described, to supply the hot regenerated catalyst to the high temperature high velocity short contact time dilute phase reaction zone 12. A further portion of the hot regenerated catalyst is withdrawn from regenerator 20 through standpipe 57 at a rate controlled by slide valve 58 and introduced into the upper portion of stripper 22 to supply heat to the stripper. Hot regenerated catalyst from standpipe 57 is mixed in stripper 22 with spent catalyst from standpipe 14 in an amount such that the stripping temperature is maintained substantially above the temperature of reaction zone 12. Additional oil may be supplied through line 59 to the spent catalyst in the lower part of vessel 15 if necessary to maintain a heat balance in the system.

In the process of this invention, hydrocarbon oil charged to the reaction zone 12 is preferably preheated to an elevated temperature in the range of about 400° F. to about 750° F. Preferably, the preheat temperature of the hydrocarbon does not exceed the temperature at which substantial thermal cracking begins to occur. Additional heat required to raise the temperature in the hydrocarbon in the reaction zone to the desired reaction temperature of 1150° to 1350° F. is provided by the hot regenerated catalyst at a temperature in the range of from about 1250° F. to about 1450° F. The total pressure in the system is preferably in the range of 5 to 15 psig (135 to 200 kPa). Preferred reaction conditions are further illustrated in the following specific example of a preferred embodiment of the process of this invention.

EXAMPLE

As an example of a specific preferred embodiment of the present invention the oil feed preferably comprises a light virgin gas oil preheated to a temperature in the range of 400° to 750° F. prior to introduction into the reaction zone. The regenerated catalyst brought into contact with the oil feed in the reaction zone is preferably at a temperature in the range of 1250° to 1450° F. A catalyst to oil weight ratio in the range of 5 to 20 and a reactor pressure in the range of 135 to 200 kPa (5 to 15 psig). Contact time between the catalyst and the fresh feed is preferably in the range of 0.1 to 1 second. A preferred catalyst is a zeolite type cracking catalyst as represented by the commercial catalyst sold by Davison Chemical Company under the trade name "Davison Super D Extra".

As a specific examples of the method and apparatus illustrated in the FIGURE, the following equipment and process design specifications are illustrative.

DESIGN SPECIFICATIONS

Reactor Temperature, F.—1200
Reactor Pressure, psig—15
Total Feed Rate, BPSD—20,000
Feed Gravity, API—25.9
Catalyst/Oil Weight Ratio—16.8
Reactor Catalyst Density, lbs/cu ft—5.5
Reactor Diameter, Inches, ID.—40
Reactor Length, Ft—35
Stripper Height, Ft—25
Stripper Diameter, Ft—10.5
Stripping Steam, lb/hr—8,820
Primary Regenerator Diameter, Ft—16
Primary Regenerator Height, Ft—12
Riser Regenerator Diameter, Inches, ID—84
Riser Regenerator Length, Ft—100
Regenerator Air, lbs/hr
  Primary Regenerator—191,500
  Riser Regenerator Air—87,900
Regenerator Catalyst Receiver ID, Ft—28
Catalyst Receiver Height, Ft—30
Regenerator Pressure, psig
  At Inlet to Riser Regenerator—28.3
  At Bottom of Primary Regenerator—30.6
Primary Regenerator Bed Density, lb/cu ft—28
Catalyst Density, Riser, lb/cu ft—1.4
Temperatures, F.—
Oil Feed—500
Regenerated Catalyst—1,400
Stripping Steam—344
Stripper—1,250
Regeneration Air—400
Primary Regeneration Bed—1,250
Riser Regeneration—1,400
Flue Gas—1,400

We claim:

1. In a fluidized catalytic hydrocarbon conversion process wherein hydrocarbon conversion is carried out in a transport type reaction zone in the presence of hot freshly regenerated catalyst, spent catalyst from said reaction zone is stripped of volatile hydrocarbons in a catalyst stripping zone in admixture with hot freshly regenerated catalyst, and stripped catalyst is regenerated with an oxygen-containing gas in a catalyst regeneration zone, the improvement which comprises contacting freshly regenerated cracking catalyst with vaporized hydrocarbon feedstock in a substantially horizontal transport reaction zone maintained at an elevated cracking temperature in the range of 1150° to 1350° F. and passing said catalyst and vaporized hydrocarbon through said reaction zone with an average contact time in the range of 0.1 to 1 second, discharging reaction products and spent catalyst from said reaction zone into a separation zone effecting substantially complete separation of hydrocarbon conversion products from spent catalyst, passing spent catalyst to a stripping zone into admixture with freshly regenerated catalyst at a temperature in the range of 1275° to 1450° F., stripping said spent catalyst with steam at a temperature in the range of 1200° to 1400° F., passing stripped catalyst from said stripping zone to a first catalyst regeneration zone, maintaining a dense phase fluidized bed of catalyst in said first regeneration zone by the introduction of primary regeneration air into the lower portion of said zone at a rate sufficient to cause fluidization of said catalyst particles and regeneration of said catalyst, passing partially regenerated catalyst particles from said dense phase fluidized bed regeneration zone into a dilute phase entrained catalyst riser regeneration zone, supplying secondary regeneration air to said riser regeneration zone in an amount sufficient to provide an excess of oxygen over that required for complete combustion of coke from said catalyst to carbon dioxide, discharging regenerated catalyst and flue gases resulting from the burning of coke from spent catalyst from the riser regneration zone into the lower portion of a second dense phase fluidized bed regenerator zone, discharging resulting flue gases containing 2 to 5 mole percent oxygen and less than 500 ppm carbon monoxide from said second regeneration zone, withdrawing regenerated catalyst at a temperature in a range of 1250° to 1450° F. from said second dense phase regeneration zone into said reaction zone, and withdrawing a separate portion of said regenerated catalyst from said second dense phase fluid bed catalyst regeneration zone to said stripping zone.

2. A process in accordance with claim 1 wherein hydrocarbon oil is introduced into said stripping zone.

3. A process in accordance with claim 1 wherein hydrocarbon oil is introduced into the lower portion of said riser regeneration zone.

4. In a fluidized catalytic hydrocarbon conversion process wherein hydrocarbon conversion is carried out in a transport type reaction zone in the presence of hot freshly regenerated catalyst, spent catalyst from said reaction zone is stripped of volatile hydrocarbons in a catalyst stripping zone in admixture with hot freshly regenerated catalyst, and stripped catalyst is regenerated with an oxygen-containing gas in a catalyst regeneration zone, the improvement which comprises introducing only freshly regenerated cracking catalyst directly from the regeneration zone into a substantially horizontal transport reaction zone maintained at an elevated cracking temperature in the range of 1150° to 1350° F. in contact with hydrocarbon feedstock and passing said catalyst and hydrocarbon feedstock through said reaction zone with an average contact time in the range of 0.1 to 1 second, discharging reaction products and spent catalyst from said reaction zone into a separation zone, and effecting substantially complete separation of hydrocarbon convesion products from spent catalyst in said separation zone.

5. A process according to claim 4 wherein said spent catalyst is passed to a stripping zone into admixture with freshly regenerated catalyst at a temperature in the range of 1275° to 1450° F., and the resulting catalyst mixture stripped with steam at a temperature in the range of 1200° to 1400° F.

6. A process according to claim 5 comprising the additional steps of passing stripped spent catalyst from said stripping zone to a first catalyst regeneration zone, maintaining a dense phase fluidized bed of catalyst in said first regeneration zone by the introduction of primary regeneration air into the lower portion of said zone at a rate sufficient to cause fluidization of said catalyst particles and regeneration of said spent catalyst, passing partially regenerated catalyst particles from said dense phase fluidized bed regeneration zone into a dilute phase entrained catalyst riser regeneration zone, supplying secondary regeneration air to said riser regeneration zone in an amount sufficient to provide an excess of oxygen over that required for complete combustion of coke from said catalyst to carbon dioxide, discharging regenerated catalyst and flue gases resulting from the burning of coke from spent catalyst from the riser regeneration zone into the lower portion of a second dense phase fluidized bed regeneration zone, discharging resulting flue gases from said second regeneration zone, and withdrawing regenerated catalyst at a temperature in a range of 1250° to 1450° F. from said second dense phase regeneration zone into said reaction zone.

* * * * *